United States Patent
Huang

(10) Patent No.: US 6,175,659 B1
(45) Date of Patent: Jan. 16, 2001

(54) METHOD AND APPARATUS FOR IMAGE SCALING USING ADAPTIVE EDGE ENHANCEMENT

(75) Inventor: Chien-Hsiu Huang, Tainan Hsien (TW)

(73) Assignee: Silicon Intergrated Systems Corp., Hsin-Chu (TW)

( * ) Notice: Under 35 U.S.C. 154(b), the term of this patent shall be extended for 0 days.

(21) Appl. No.: 09/166,919

(22) Filed: Oct. 6, 1998

(51) Int. Cl.$^7$ .................................. G06T 5/00; G06T 3/40
(52) U.S. Cl. ........................ 382/266; 382/298; 382/300
(58) Field of Search ...................................... 382/199, 205, 382/261, 266, 269, 272, 298, 299, 300

(56) References Cited

U.S. PATENT DOCUMENTS

| | | | |
|---|---|---|---|
| 4,334,244 | * | 6/1982 | Chan et al. ............................ 382/261 |
| 5,335,295 | * | 8/1994 | Ferracini et al. ..................... 382/298 |
| 5,825,937 | * | 10/1998 | Ohuchi et al. ........................ 382/261 |

* cited by examiner

*Primary Examiner*—Scott Rogers
*Assistant Examiner*—Gholam A. Behpour
(74) *Attorney, Agent, or Firm*—Finnegan, Henderson, Farabow, Garrett and Dunner, L.L.P.

(57) ABSTRACT

In an image scaling method and apparatus that uses adaptive edge enhancement, a plurality of sets of gradient threshold values and enhancement threshold values correspond respectively to predetermined enhancement modes. The enhancement mode corresponding to a mean pixel value for a one-dimensional pixel array that includes a center pixel to be updated and neighboring pixels of the center pixel is determined so that one of the sets of gradient threshold values and enhancement threshold values corresponding to the selected enhancement mode can be selected. After a sharpness value is computed by adding together absolute values of differences between values of the center pixel and each of the neighboring pixels, one of the enhancement threshold values in the selected set is selected by comparing the sharpness value with the gradient threshold values in the selected set. A sign of the selected enhancement threshold value is then determined such that difference between left side brightness and right side brightness is increased when the selected enhancement threshold value is added to the value of the center pixel.

8 Claims, 2 Drawing Sheets

METHOD AND APPARATUS FOR IMAGE SCALING USING ADAPTIVE EDGE ENHANCEMENT

BACKGROUND OF THE INVENTION

1. Field of the Invention

The invention relates to image scaling, more particularly to a method and apparatus for image scaling using adaptive edge enhancement.

2. Description of the Related Art

As technology improves, integration of computer and consumer electronics has become a primary consideration to provide better functionality to consumers. When displaying a computer video graphics adapter (VGA) signal on a television screen, video signals are scaled to match the aspect ratio of digital television terminals. Image scaling in digital television terminals can provide different viewing flexibility for viewers.

Presently, image scaling uses linear interpolation or digital differential analyzer (DDA) to scale images. However, for different scaling factors, traditional approaches require a large hardware cost to meet real time video applications. In addition, image scaling often blurs the edges of differently colored portions in an image since interpolation acts as a low-pass filter when scaling images. Thus, edge enhancement has to be performed to make the scaled images sharper and clearer.

Conventional edge enhancement techniques do not produce good image quality since they do not consider image contents for subsequent image scaling. Since visual sensitivity of the human eye depends on the brightness of the background, adaptive edge enhancement can avoid the defects of conventional methods and can provide viewers with better image quality.

SUMMARY OF THE INVENTION

Therefore, the main object of the present invention is to provide a method and apparatus for image scaling using adaptive edge enhancement so as to overcome the aforementioned drawbacks that are commonly associated with the prior art.

According to one aspect of the present invention, a method for image scaling using adaptive edge enhancement comprises the steps of:

providing a plurality of sets of gradient threshold values and enhancement threshold values that correspond respectively to predetermined enhancement modes;

computing a mean pixel value for a one-dimensional pixel array that includes a center pixel to be updated and neighboring pixels of the center pixel;

selecting one of the enhancement modes based on the mean pixel value;

selecting one of the sets of gradient threshold values and enhancement threshold values based on the selected one of the enhancement modes;

computing a sharpness value by adding together absolute values of differences between values of the center pixel and each of the neighboring pixels;

selecting one of the enhancement threshold values in the selected one of the sets by comparing the sharpness value with the gradient threshold values in the selected one of the sets;

determining a sign of the selected one of the enhancement threshold values such that difference between left side brightness and right side brightness is increased when the selected one of the enhancement threshold values is added to the value of the center pixel; and updating the center pixel by adding the selected one of the enhancement threshold values to the value of the center pixel while taking into account the sign of the selected one of the enhancement threshold values, thereby resulting in an edge-enhanced image.

Preferably, the method further comprises the steps of:

accumulating a binary accumulation factor in a binary accumulator, the accumulation factor being a quotient of an image resolution-dependent base value and a user-defined scaling factor, the accumulator having an output that includes a binary weighting output and a carry bit;

storing the pixels of the edge-enhanced image in a line buffer;

controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and interpolating the consecutive pixels from the line buffer to obtain a scaled pixel by multiplying value of a first one of the consecutive pixels with value of first three most significant bits of the weighting output to result in a first product, multiplying value of a second one of the consecutive pixels with difference of 8 and the value of the first three most significant bits of the weighting output to result in a second product, adding together the first and second products to obtain a sum, and dividing the sum by 8.

According to another aspect of the present invention, an apparatus for image scaling comprises an adaptive edge enhancement device that includes:

a threshold multiplexer having data inputs which respectively receive a plurality of sets of gradient threshold values and enhancement threshold values that correspond respectively to predetermined enhancement modes;

a mean value computing unit adapted to compute a mean pixel value for a one-dimensional pixel array that includes a center pixel to be updated and neighboring pixels of the center pixel;

an adaptive mode selector, connected to the mean value computing unit, for selecting one of the enhancement modes based on the mean pixel value;

means, interconnecting the adaptive mode selector and the threshold multiplexer, for controlling the threshold multiplexer to select one of the sets of gradient threshold values and enhancement threshold values based on the selected one of the enhancement modes;

a gradient logic computing unit adapted to compute a sharpness value by adding together absolute values of differences between values of the center pixel and each of the neighboring pixels;

a gradient level selector, connected to the threshold multiplexer and the gradient logic computing unit, for selecting one of the enhancement threshold values in the selected one of the sets by comparing the sharpness value with the gradient threshold values in the selected one of the sets;

a threshold sign selector adapted to determine a sign of the selected one of the enhancement threshold values such that difference between left side brightness and right side brightness is increased when the selected one of the enhancement threshold values is added to the value of the center pixel; and a pixel updating unit connected to the threshold sign selector and the gradient level selector, and adapted to update the center pixel by adding the selected one of the enhancement threshold values to the value of the center pixel while taking into account the sign of the selected one of the enhancement threshold values, thereby resulting in an edge-enhanced image.

Preferably, the apparatus further comprises an image-scaling device for scaling updated pixels from the adaptive edge enhancement device. The image-scaling device includes:

a binary accumulator adapted to accumulate a binary accumulation factor therein, the accumulation factor being a quotient of an image resolution-dependent base value and a user-defined scaling factor, the accumulator having an output that includes a binary weighting output and a carry bit;

a line buffer for storing the pixels of the edge-enhanced image;

a memory access controller connected to the accumulator and the line buffer, the memory access controller controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and an interpolator, connected to the line buffer and the accumulator, for interpolating the consecutive pixels from the line buffer to obtain a scaled pixel by multiplying value of a first one of the consecutive pixels with value of first three most significant bits of the weighting output to result in a first product, multiplying value of a second one of the consecutive pixels with difference of 8 and the value of the first three most significant bits of the weighting output to result in a second product, adding together the first and second products to obtain a sum, and dividing the sum by 8.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

To display a VGA signal on a television monitor, image is scaled by an image-scaling device of the image scaling apparatus of this invention to match the required aspect ratio. In order to prevent blurring of the edges of the scaled image due to the low pass effect of the image-scaling device, edge enhancement is performed by an adaptive edge enhancement device of the image scaling apparatus before scaling is done by the image-scaling device so that the edges can be preserved after scaling. The degree of edge enhancement depends on the background brightness. Since the human eye is not sensitive to edges in a background of high brightness, the degree of edge enhancement in a background of high brightness is weaker than that in a background of low brightness. Since the background brightness varies throughout the entire image, adaptive edge enhancement can overcome the inadequacies of fixed edge enhancement and improve the image quality.

Figure 1:
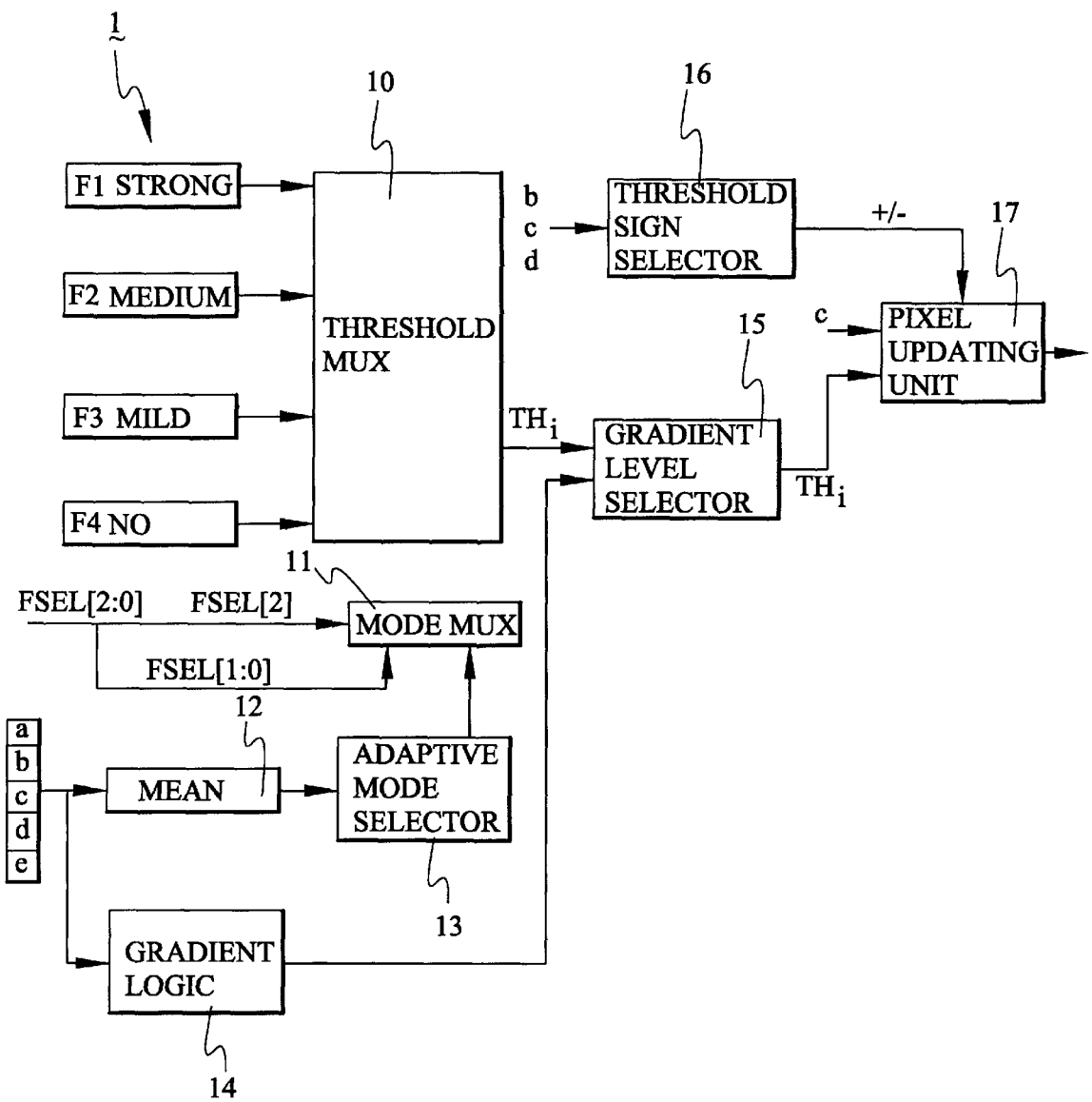
FIG. 1 is a schematic circuit block diagram of an adaptive edge enhancement device of the preferred embodiment of an image scaling apparatus according to the present invention.

Referring to FIG. 1, the adaptive edge enhancement device 1 of the preferred embodiment is shown to comprise a threshold multiplexer (MUX) 10, a mode multiplexer (MUX) 11, a mean-value computing unit 12, an adaptive mode selector 13, a gradient logic computing unit 14, a gradient level selector 15, a threshold sign selector 16 and a pixel updating unit 17. The adaptive edge enhancement device 1 is suitable for horizontal edge enhancement. A vertical adaptive edge enhancement device has a block diagram similar to that shown in FIG. 1 and will not be described herein.

The threshold MUX 10 has data inputs that respectively receive a plurality of sets of gradient threshold values THi and enhancement threshold values thi. In this embodiment, each set of gradient threshold values THi, i =1 to 4, where TH4 < TH3 < TH2 < TH1, and enhancement threshold values thi, i =1 to 4, corresponds to one of four predetermined enhancement modes F1–F4, wherein F1 is a strong enhancement mode, F2 is a medium enhancement mode, F3 is a mild enhancement mode and F4 is a no enhancement mode. Selection of the enhancement mode for the pixels of an entire image can be fixed by the users in a user-defined operating state or can be done dynamically for each pixel according to the neighboring background brightness of the pixel in an adaptive operating state. In the F4 enhancement mode, no image enhancement is performed for the pixel such that the new pixel value is equal to the original pixel value. When an enhancement mode is selected, the threshold MUX 10 outputs the corresponding set of gradient threshold values THi, i =1 to 4, and the corresponding set of enhancement threshold values thi, i =1 to 4.

The mode MUX 11 is connected to select inputs of the threshold MUX 10 to control the selection of the enhancement mode. The mode MUX 11 receives a user input signal FSEL[2:0], where FSEL[2] serves as a select input for the mode MUX 11, and FSEL[1:0] serves as one of two data inputs of the mode MUX 11. When FSEL[2] is 0, the mode MUX 11 provides the input signal FSEL[1:0] to the threshold MUX 10 so that the following enhancement modes are selected according to the status of FSEL [1:0] to operate the threshold MUX 10 in the user-defined operating state for fixed edge enhancement of the pixels of the entire image:

| FSEL[1:0] | Enhancement Mode |
|---|---|
| 00 | F4 |
| 01 | F3 |
| 10 | F2 |
| 11 | F1 |

When FSEL[2] is 1, the mode MUX 11 provides an input signal from the adaptive mode selector 13 to the threshold MUX 10 to operate the adaptive edge enhancement device 1 in the adaptive operating state. During the enhancement of a pixel, such as pixel c, in the adaptive operating state, the neighboring pixels a, b, d and e are taken into account in determining the appropriate enhancement mode.

The mean-value computing unit 12 computes the mean pixel value of a one-dimensional pixel array that includes a center pixel to be updated, e.g. pixel c, and neighboring pixels of the center pixel, e.g. pixels a, b, d and e. The adaptive mode selector 13 is connected to the mean value computing unit 12 and receives the computed mean pixel value therefrom. The adaptive mode selector 13 compares the computed mean pixel value with predetermined threshold values, e.g. ME_TH1 to ME_TH3, where 0 < ME_TH3 < ME_TH2 < ME_TH1, to determine a corresponding enhancement mode selection signal that serves as the other one of the data inputs of the mode MUX 11 and that is selected by the mode MUX 11 when FSEL[2] is 1. When the computed mean pixel value is greater than the first threshold value ME_TH1, the adaptive mode selector 13 provides the enhancement mode selection signal "11" to the mode MUX 11 so as to enable the threshold MUX 10 to select the F4 enhancement mode. When the computed mean pixel value is between the first threshold value ME_TH1 and the second threshold value ME_TH2, the adaptive mode selector 13 provides the enhancement mode selection signal "10" to the mode MUX 11 so as to enable the threshold MUX 10 to select the F3 enhancement mode. When the computed mean pixel value is between the second threshold value ME_TH2 and the third threshold value ME_TH3, the adaptive mode selector 13 provides the enhancement mode selection signal "01" to the mode MUX 11 so as to enable the threshold MUX 10 to select the F2 enhancement mode. When the computed mean pixel value is less than the third threshold value ME_TH3, the adaptive mode selector 13 provides the enhancement mode selection signal "00" to the mode MUX 11 so as to enable the threshold MUX 10 to select the F1 enhancement mode.

In each of the F1 to F3 enhancement modes, the sharpness of the edge of an image is classified into one of five levels so that an appropriate one of the enhancement threshold values th1–th4 can be added to the pixel being enhanced. The sharpness value (det) of the image edge is determined by the gradient logic computing unit 14, which receives the pixels a, b, c, d and e, according to the following equation:

$$det = abs(c-a) + abs(c-b) + abs(c-d) + abs(c-e)$$

The gradient level selector 15 is connected to the threshold MUX 10 so as to receive the selected set of gradient threshold values THi, i =1 to 4, and the corresponding set of enhancement threshold values thi, i =1 to 4, therefrom. The gradient level selector 15 is further connected to the gradient logic computing unit 14 to receive the calculated sharpness value (det). The gradient level selector 15 selects one of the enhancement threshold values thi from the threshold MUX 10 by comparing the calculated sharpness value (det) with the set of gradient threshold values THi. Particularly, the enhancement threshold value th1 is selected when the sharpness value (det) is greater than the gradient threshold value TH1. The enhancement threshold value th2 is selected when the sharpness value (det) falls between the gradient threshold values TH1 and TH2. The enhancement threshold value th3 is selected when the sharpness value (det) falls between the gradient threshold values TH2 and TH3. The enhancement threshold value th4 is selected when the sharpness value (det) falls between the gradient threshold values TH3 and TH4. A nil value is selected when the sharpness value (det) is less than the gradient threshold value TH4.

Figure 2:
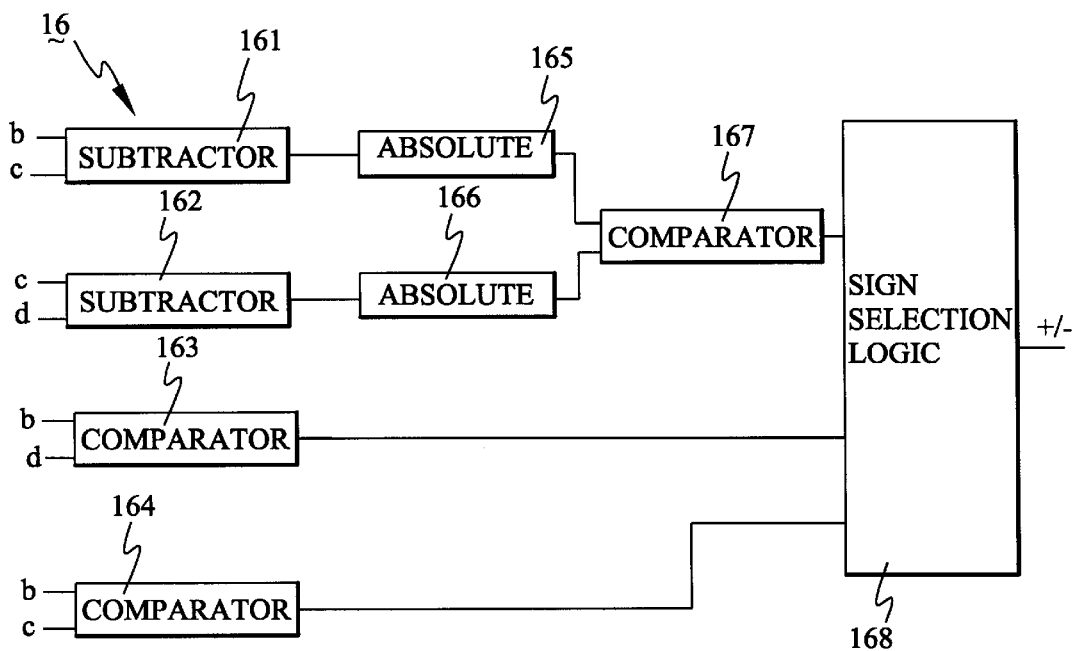
FIG. 2 is a schematic block diagram of a threshold sign selector of the adaptive edge enhancement device of FIG. 1.

To enlarge the contrast so as to enhance the image edge, the sign of the selected enhancement threshold value is determined by increasing the difference between left side brightness and right side brightness. The sign of the selected enhancement threshold value is determined by the threshold sign selector 16. Referring to FIG. 2, the threshold sign selector 16 receives the pixel to be enhanced, e.g. pixel c, and the pixels adjacent thereto, e.g. pixels b and d. The threshold sign selector 16 includes first and second subtractors 161, 162, first, second and third comparators 163, 164, 167, first and second absolute logic units 165, 166, and a sign selection logic 168.

The first subtractor 161 calculates the difference in pixel values between the pixel c and the neighboring left pixel b. The first absolute logic unit 165 is connected to the first subtractor 161 and obtains the absolute value (difl) of the output of the latter.

The second subtractor 162 calculates the difference in pixel values between the pixel c and the neighboring right pixel d. The second absolute logic unit 166 is connected to the second subtractor 162 and obtains the absolute value (difr) of the output of the latter.

The first comparator 163 compares the value of pixel b with that of pixel d. The second comparator 164 compares the value of pixel b with that of pixel c. The third comparator 167 is connected to the first and second absolute logic units 165, 166, and compares the absolute values (difl, difr).

The sign selection logic 168 is connected to the first, second and third comparators 163, 164, 167. When the absolute value (difl) is less than the absolute value (difr), and the value of pixel b is less than that of pixel d, the sign selection logic 168 determines the sign of the selected enhancement threshold value to be negative. When the absolute value (difl) is greater than the absolute value (difr), and the value of pixel b is greater than that of pixel d, the sign selection logic 168 determines the sign of the selected enhancement threshold value to be negative. When the absolute value (difl) is greater than the absolute value (difr), and the value of pixel b is less than that of pixel d, the sign selection logic 168 determines the sign of the selected enhancement threshold value to be positive. When the absolute value (difl) is less than the absolute value (difr), and the value of pixel b is greater than that of pixel d, the sign selection logic 168 determines the sign of the selected enhancement threshold value to be positive. If the absolute values (difl, difr) are equal, the sign of the selected gradient threshold value is determined by comparing the values of pixels b and c. Under this condition, if the value of pixel c is less than that of pixel b, the sign selection logic 168 determines the sign of the selected enhancement threshold value to be negative, and if the value of pixel c is greater than that of pixel b, the sign selection logic 168 determines the sign of the selected enhancement threshold value to be positive.

Referring again to FIG. 1, the pixel updating unit 17 is connected to the threshold sign selector 16 and the gradient level selector 15, and receives the pixel to be updated, such as pixel c. Taking into account the output of the threshold sign selector 16, the pixel updating unit 17 updates the input pixel by adding the selected enhancement threshold value provided by the gradient level selector 15 to the value of the input pixel. An edge-enhanced image can thus be obtained from the adaptive edge enhancement device 1 of the preferred embodiment.

Figure 3:
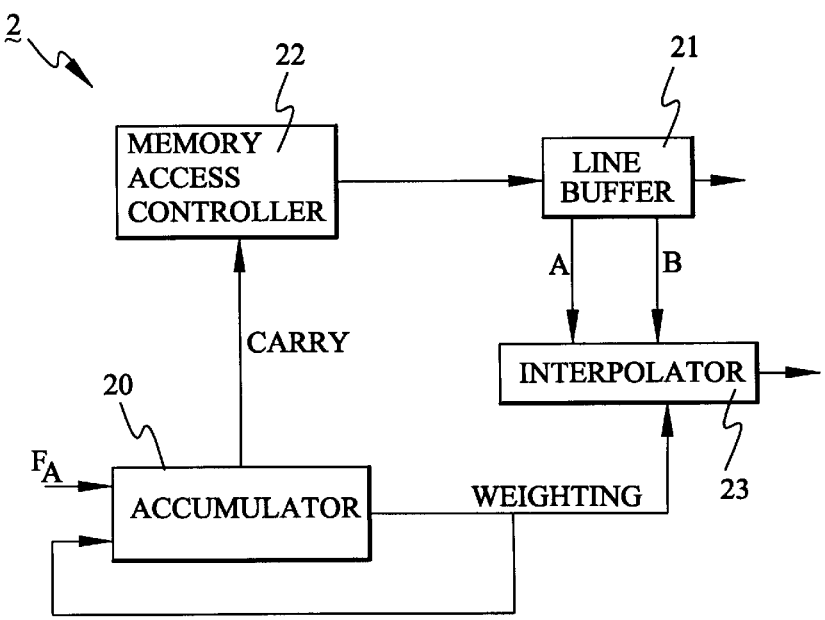
FIG. 3 is a schematic circuit block diagram of an image-scaling device of the apparatus of the preferred embodiment.

After edge enhancement, the image-scaling device of the image scaling apparatus of the preferred embodiment performs image scaling of the edge-enhanced image for different user-defined scaling factors. The image-scaling device scales an image by interpolating two consecutive pixels i and i+1. The two pixels i and i+1 are consecutive in a vertical direction during vertical image scaling, and are consecutive in a horizontal direction during horizontal image scaling. Referring to FIG. 3, the image-scaling device 2 comprises a binary accumulator 20, a line buffer 21, a memory access controller 22 and an interpolator 23.

The accumulator 20 is a fixed word length accumulator 20 that accumulates a binary accumulation factor (FA). Accumulation factor (FA) is calculated by dividing a base value that depends on the intended image resolution with a user-defined scaling factor. The output of the accumulator 20 includes a binary weighting output and a carry bit.

The line buffer 21 is used for storing pixel values from the adaptive edge enhancement device 1.

The memory access controller 22 is connected to the line buffer 21 and the accumulator 20. The memory access controller 22 receives the carry bit from the accumulator 20, and controls the line buffer 21 to output the pixel values of selected consecutive ones of the pixels according to the status of the carry bit. Particularly, if the weighting output is less than the base value (carry bit =0), two consecutive pixels i and i+1 are selected for interpolation. If the weighting output is greater than the base value (carry bit =1), the selected pixels for interpolation are one ahead of the pixel position, i.e. i+1 and i+2.

The interpolator 23 is connected to the accumulator 20 and the line buffer 21, and receives the pixel values outputted by the line buffer 21. The interpolator 23 performs image scaling according to the weighting output of the accumulator 20. In the image-scaling device 2 of the present invention, only the first three most significant bits of the weighting output of the accumulator 20 are provided to the interpolator 23 for image scaling to make a trade-off between image quality and hardware cost. The interpolator 23 performs interpolation of pixel pairs i and i+1 according to the following equation:

$$\text{New pixel value} = [B*w + A*(8-w)]/8$$

Where A is the value of pixel i, B is the value of pixel i+1, and weighting factor (w) is the value of the first three most significant bits of the weighting output from the accumulator 20. The scaling operation is applicable for both horizontal and vertical scaling.

It has thus been shown that the present invention provides a method and apparatus for image scaling using adaptive edge enhancement. Different enhancement modes are available and can be fixed by the users to enhance the entire image using the same enhancement mode. In the adaptive operating state, the enhancement mode to be used when enhancing a pixel is dynamically selected according to the corresponding background brightness. The higher the background brightness, the lower will be the level of enhancement. The threshold value to be added when updating a pixel is determined by the gradient level of edge across the pixel. The higher the gradient level, the larger will be the threshold value.

After edge enhancement, image is scaled by an image-scaling device. To simplify hardware implementation, only the first three most significant bits of the weighting output of an accumulator are provided to the interpolator. As such, a low hardware cost implementation is incurred due to simple computation, and good picture quality after image scaling results in view of contrast enlargement and blurring reduction. The objective of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for image scaling using adaptive edge enhancement, comprising the steps of:

providing a plurality of sets of gradient threshold values and enhancement threshold values that correspond respectively to predetermined enhancement modes;

computing a mean pixel value for a one-dimensional pixel array that includes a center pixel to be updated and neighboring pixels of the center pixel;

selecting one of the enhancement modes based on the mean pixel value;

selecting one of the sets of gradient threshold values and enhancement threshold values based on the selected one of the enhancement modes;

computing a sharpness value by adding together absolute values of differences between values of the center pixel and each of the neighboring pixels;

selecting one of the enhancement threshold values in the selected one of the sets by comparing the sharpness value with the gradient threshold values in the selected one of the sets;

determining a sign of the selected one of the enhancement threshold values such that difference between left side brightness and right side brightness is increased when the selected one of the enhancement threshold values is added to the value of the center pixel; and updating the center pixel by adding the selected one of the enhancement threshold values to the value of the center pixel while taking into account the sign of the selected one of the enhancement threshold values, thereby resulting in an edge-enhanced image.

2. The method as claimed in claim 1, wherein the step of determining the sign of the selected one of the enhancement threshold values comprises the steps of:

calculating an absolute value (difl) of difference between the values of the center pixel and a left one of the neighboring pixels;

calculating an absolute value (difr) of difference between the values of the center pixel and a right one of the neighboring pixels;

comparing the values of the left one of the neighboring pixels and the right one of the neighboring pixels;

comparing the values of the left one of the neighboring pixels and the center pixel;

comparing the absolute values (difl, difr);

determining the sign of the selected one of the enhancement threshold values to be negative when the absolute value (difl) is less than the absolute value (difr), and the value of the left one of the neighboring pixels is less than the value of the right one of the neighboring pixels;

determining the sign of the selected one of the enhancement threshold values to be negative when the absolute value (difl) is greater than the absolute value (difr), and the value of the left one of the neighboring pixels is greater than the value of the right one of the neighboring pixels;

determining the sign of the selected one of the enhancement threshold values to be positive when the absolute value (difl) is greater than the absolute value (difr), and the value of the left one of the neighboring pixels is less than the value of the right one of the neighboring pixels;

determining the sign of the selected one of the enhancement threshold values to be positive when the absolute value (difl) is less than the absolute value (difr), and the value of the left one of the neighboring pixels is greater than the value of the right one of the neighboring pixels;

determining the sign of the selected one of the enhancement threshold values to be negative when the absolute values (difl, difr) are equal, and the value of the center pixel is less than the value of the left one of the neighboring pixels; and determining the sign of the selected one of the enhancement threshold values to be positive when the absolute values (difl, difr) are equal, and the value of the center pixel is greater than the value of the left one of the neighboring pixels.

3. The method as claimed in claim 1, further comprising the steps of:

accumulating a binary accumulation factor in a binary accumulator, the accumulation factor being a quotient of an image resolution-dependent base value and a user-defined scaling factor, the accumulator having an output that includes a binary weighting output and a carry bit;

storing the pixels of the edge-enhanced image in a line buffer;

controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and interpolating the consecutive pixels from the line buffer to obtain a scaled pixel by
multiplying value of a first one of the consecutive pixels with value of first three most significant bits of the weighting output to result in a first product,
multiplying value of a second one of the consecutive pixels with difference of 8 and the value of the first three most significant bits of the weighting output to result in a second product,
adding together the first and second products to obtain a sum, and
dividing the sum by 8.

4. An apparatus for image scaling, comprising an adaptive edge enhancement device that includes:

a threshold multiplexer having data inputs which respectively receive a plurality of sets of gradient threshold values and enhancement threshold values that correspond respectively to predetermined enhancement modes;

a mean value computing unit adapted to compute a mean pixel value for a one-dimensional pixel array that includes a center pixel to be updated and neighboring pixels of the center pixel;

an adaptive mode selector, connected to the mean value computing unit, for selecting one of the enhancement modes based on the mean pixel value;

means, interconnecting the adaptive mode selector and the threshold multiplexer, for controlling the threshold multiplexer to select one of the sets of gradient threshold values and enhancement threshold values based on the selected one of the enhancement modes;

a gradient logic computing unit adapted to compute a sharpness value by adding together absolute values of differences between values of the center pixel and each of the neighboring pixels;

a gradient level selector, connected to the threshold multiplexer and the gradient logic computing unit, for selecting one of the enhancement threshold values in the selected one of the sets by comparing the sharpness value with the gradient threshold values in the selected one of the sets;

a threshold sign selector adapted to determine a sign of the selected one of the enhancement threshold values such that difference between left side brightness and right side brightness is increased when the selected one of the enhancement threshold values is added to the value of the center pixel; and a pixel updating unit connected to the threshold sign selector and the gradient level selector, and adapted to update the center pixel by adding the selected one of the enhancement threshold values to the value of the center pixel while taking into account the sign of the selected one of the enhancement threshold values, thereby resulting in an edge-enhanced image.

5. The apparatus as claimed in claim 4, wherein the threshold sign selector comprises:

first subtractor means adapted for calculating an absolute value (difl) of difference between the values of the center pixel and a left one of the neighboring pixels;

second subtractor means adapted for calculating an absolute value (difr) of difference between the values of the center pixel and a right one of the neighboring pixels;

first comparator means adapted for comparing the values of the left one of the neighboring pixels and the right one of the neighboring pixels;

second comparator means adapted for comparing the values of the left one of the neighboring pixels and the center pixel;

third comparator means, connected to the first and second subtractor means, for comparing the absolute values (difl, difr); and a sign selection logic connected to the first, second and third comparator means;

the sign selection logic determining the sign of the selected one of the enhancement threshold values to be negative when the absolute value (difl) is less than the absolute value (difr), and the value of the left one of the neighboring pixels is less than the value of the right one of the neighboring pixels;

the sign selection logic determining the sign of the selected one of the enhancement threshold values to be negative when the absolute value (difl) is greater than the absolute value (difr), and the value of the left one of the neighboring pixels is greater than the value of the right one of the neighboring pixels;

the sign selection logic determining the sign of the selected one of the enhancement threshold values to be positive when the absolute value (difl) is greater than the absolute value (difr), and the value of the left one of the neighboring pixels is less than the value of the right one of the neighboring pixels;

the sign selection logic determining the sign of the selected one of the enhancement threshold values to be positive when the absolute value (difl) is less than the absolute value (difr), and the value of the left one of the neighboring pixels is greater than the value of the right one of the neighboring pixels;

the sign selection logic determining the sign of the selected one of the enhancement threshold values to be negative when the absolute values (difl, difr) are equal, and the value of the center pixel is less than the value of the left one of the neighboring pixels; and the sign selection logic determining the sign of the selected one of the enhancement threshold values to be positive when the absolute values (difl, difr) are equal, and the value of the center pixel is greater than the value of the left one of the neighboring pixels.

6. The apparatus as claimed in claim 4, further comprising an image-scaling device for scaling the edge-enhanced image from the adaptive edge enhancement device, the image-scaling device including:

a binary accumulator adapted to accumulate a binary accumulation factor therein, the accumulation factor being a quotient of an image resolution-dependent base value and a user-defined scaling factor, the accumulator having an output that includes a binary weighting output and a carry bit;

a line buffer for storing the pixels of the edge-enhanced image;

a memory access controller connected to the accumulator and the line buffer, the memory access controller controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and an interpolator, connected to the line buffer and the accumulator, for interpolating the consecutive pixels from the line buffer to obtain a scaled pixel by
multiplying value of a first one of the consecutive pixels with value of first three most significant bits of the weighting output to result in a first product,
multiplying value of a second one of the consecutive pixels with difference of 8 and the value of the first three most significant bits of the weighting output to result in a second product,
adding together the first and second products to obtain a sum, and
dividing the sum by 8.

7. A method for scaling an image, comprising the steps of:
accumulating a binary accumulation factor in a binary accumulator, the accumulation factor being a quotient of an image resolution-dependent base value and a user-defined scaling factor, the accumulator having an output that includes a binary weighting output and a carry bit;

storing pixels of the image in a line buffer;

controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and interpolating the consecutive pixels from the line buffer to obtain a scaled pixel by
multiplying value of a first one of the consecutive pixels with value of first three most significant bits of the weighting output to result in a first product,
multiplying value of a second one of the consecutive pixels with difference of 8 and the value of the first three most significant bits of the weighting output to result in a second product,
adding together the first and second products to obtain a sum, and
dividing the sum by 8.

8. An image scaling device for scaling an image, comprising:

a binary accumulator adapted to accumulate a binary accumulation factor therein, the accumulation factor being a quotient of an image resolution-dependent base value and a user-defined scaling factor, the accumulator having an output that includes a binary weighting output and a carry bit;

a line buffer adapted for storing pixels of the image therein;

a memory access controller connected to the accumulator and the line buffer, the memory access controller controlling the line buffer to output two consecutive pixels i and i+1 when the carry bit is 0, indicating that the weighting output is less than the base value, and to output two consecutive pixels i+1 and i+2 when the carry bit is 1, indicating that the weighting output is greater than the base value; and an interpolator, connected to the line buffer and the accumulator, for interpolating the consecutive pixels from the line buffer to obtain a scaled pixel by
multiplying value of a first one of the consecutive pixels with value of first three most significant bits of the weighting output to result in a first product,
multiplying value of a second one of the consecutive pixels with difference of 8 and the value of the first three most significant bits of the weighting output to result in a second product,
adding together the first and second products to obtain a sum, and
dividing the sum by 8.

* * * * *